United States Patent [19]

Holtey et al.

[11] Patent Number: 5,293,424
[45] Date of Patent: Mar. 8, 1994

[54] SECURE MEMORY CARD

[75] Inventors: Thomas O. Holtey, Newton, Mass.; Peter J. Wilson, Leander, Tex.

[73] Assignee: Bull HN Information Systems Inc., Billerica, Mass.

[21] Appl. No.: 960,748

[22] Filed: Oct. 14, 1992

[51] Int. Cl.$^5$ .......................... H04K 1/00; G06K 5/00; H04L 9/00
[52] U.S. Cl. ..................... 380/23; 235/380; 235/382; 380/24
[58] Field of Search ................. 235/380, 382; 380/23, 380/24

[56] References Cited

U.S. PATENT DOCUMENTS

| | | | |
|---|---|---|---|
| 4,382,279 | 5/1983 | Ugon | 364/200 |
| 4,650,975 | 3/1987 | Kitchener | 235/375 |
| 4,742,215 | 5/1988 | Daughters et al. | 235/487 |
| 4,907,273 | 3/1990 | Wiedemer | 380/5 |
| 4,960,982 | 10/1990 | Takahira | 235/382 |
| 4,985,920 | 1/1991 | Seki et al. | 380/23 |
| 5,048,085 | 9/1991 | Abraham et al. | 380/23 |
| 5,148,481 | 9/1992 | Abraham et al. | 380/46 |

Primary Examiner—Stephen C. Buczinski
Attorney, Agent, or Firm—Faith F. Driscoll; John S. Solakian

[57] ABSTRACT

A secure memory card includes a microprocessor on a single semiconductor chip and one or more non-volatile addressable memory chips. The microprocessor chip and non-volatile memory chips connect in common to an internal card bus for transmitting address, data and control information to such non-volatile memory chips. The microprocessor includes an addressable non-volatile memory for storing information including a number of key values, application specific configuration information and program instruction information. Each chip's memory is organized into a number of blocks or banks and each memory chip is constructed to include security control logic circuits. These circuits include a number of non-volatile and volatile memory devices which are loaded with key and configuration information under the control of the microprocessor only after the microprocessor has determined that the user has successfully performed a predetermined authentication procedure with a host computer. Thereafter, the user is allowed to read out information from blocks only as defined by the configuration information.

26 Claims, 5 Drawing Sheets

SECURE MEMORY CARD

BACKGROUND OF THE INVENTION

1. Technical Field

This invention relates to the field of portable personal computers and more particularly to maintaining systems for data security in a portable digital information environment.

2. Description of the Prior Art

The security of personal information has forever been a concern. It has been ensured by locks, codes and secret pockets. As information has taken new forms, new methods have been required to meet the changed situations.

Historically, security of information has been addressed by use of signatures, credentials and photographs. Electronic devices such as automatic banking machines have added encoded cards and personal identification numbers (PINS) to the repertoire of security tools. Computer systems continue to use passwords.

More recently the "Smart Card" has been used as a security tool. The "Smart Card" is a small microcomputer with writable, non-volatile memory and a simple input/output interface, fabricated as a single chip and embedded in a plastic "credit card". It has exterior pads to allow it to be connected to specially designed equipment. The program contained in the card's microcomputer interacts with this equipment and allows its non-volatile memory data to be read or modified according to the desired algorithm which may optionally include a password exchange. Special techniques have been implemented to protect the memory information and to allow varied permissions according to the situation. For example, U.S. Pat. No. 4,382,279 entitled, "Single Chip Microprocessor with On-Chip Modifiable Memory" discloses an architecture which permits automatic programming of a non-volatile memory which is included on the same chip as a processing and control unit. As in other systems, the microprocessor only protects memory on the same chip.

The "Smart Card" has been used both to facilitate the process of identification and to be the actual site of the valued information. In this situation, as in most past situations, physical presence of a "key" as well as some special knowledge has been used as part of the verification or authentication process. In such above cases, identification has been a dialog between the person desiring access and a fixed agency such as a security guard or an automatic teller machine.

The current state of portability of freestanding computing devices makes it possible for both the physical key and the authentication agent to be small, portable and hence more subject to loss or theft. Further, computing devices make it possible to perform repeated attempts to guess or deduce the special knowledge or password associated with the identification process. This is especially true if the authentication agent or device is also in the control of the thief or burglar. To make matters worse, technology now allows and encourages the carrying of enormous amounts of sensitive information in a pocket or handbag where it is subject to mishap.

Today, notebook and subnotebook sized computers provide a capable freestanding environment which allows for significant computing power and thus creates a need for additional data storage capability. This has initially been met by miniature hard disk devices which hold both programs and data. While password protection is often used in these systems, it does not completely protect sensitive data because, first, the authentication agent is itself vulnerable. However, more significantly, the disk drive containing the data can be physically removed and accessed in a setting more conducive to data analysis. In this case, only some form of encryption is capable of protecting the data. The nature of disk access makes this possible without undue performance or cost barriers. An example of this type of system is described in U.S. Pat. No. 4,985,920 entitled, "Integrated Circuit Card."

The recent emergence of the flash memory and removable "memory cards" has allowed major reductions in size and power requirements of the portable computer. The flash memory combines the flexibility of random access memory (RAM) with the permanence of disks. Today, the coupling of these technologies allows up to 20 million bytes of data to be contained, without need of power, in a credit card size, removable package. This data can be made to appear to a host system either as if it were contained in a conventional disk drive or as if it were an extension of the host's memory. These technological developments have made further reduction in system size possible to the extent that it may be carried in a pocket rather than in a handbag or briefcase.

Thus, the data and its host system have become more vulnerable to loss or theft and simultaneously more difficult to protect memory data by encryption as this presents major cost and performance barriers.

Accordingly, it is a primary object of the invention to provide a portable digital system with a secure memory subsystem.

It is another object of the invention to provide a memory card which can be protected if removed from a portable digital system.

It is still a further object of the present invention to provide a memory card in which the chips of the card are protected if removed from such card.

SUMMARY OF THE INVENTION

The above objects are achieved in the secure card of a preferred embodiment of the present invention. The secure memory card includes a microprocessor on a single semiconductor chip and one or more non-volatile addressable memory chips. The microprocessor chip and nonvolatile memory chips connect in common to an internal card bus for transmitting address, data and control information to such non-volatile memory chips. The microprocessor includes an addressable non-volatile memory for storing information including a number of key values, configuration information and program instruction information for controlling the transfer of address, data and control information on the internal bus. The chip memory is organized into a number of blocks or banks, each block having a plurality of addressable locations.

According to the present invention, each memory chip is constructed to include security control logic circuits. In the preferred embodiment, these circuits include a non-volatile lock memory, a non-volatile lock storage enable element and a volatile access control memory, each being loadable under the control of the microprocessor. More specifically, the microprocessor first loads a lock value into the non-volatile lock memory and resets the lock storage enable element inhibiting access. Thereafter, the microprocessor loads the access control memory as specified by the configuration information. Such information is loaded only after the microprocessor has determined that the user has successfully performed a predetermined authentication procedure with a host computer. The security logic circuits of each memory enable the reading of information stored in selected addressed blocks of the flash memory as a function of the configuration information loaded into the memory chip's access control memory. Periodically, the user is required to successfully perform an authentication procedure with the host computer, and the user is allowed to continue reading information as allowed by the access control memory. In the preferred embodiment, the host computer is coupled to the memory card through a standard interface such as the interface which conforms to the Personal Computer Memory Card International Association (PCMCIA) standards.

The present invention melds the "SmartCard" and "memory card" technologies which is key to allowing the protection of the large amounts of data made possible by the flash memory technology in the "security harsh" environments which electronic miniaturization has created. Further, the present invention is able to take advantage of improvements and enhancements in both technologies.

Additionally, the security logic circuits of the present invention are incorporated into and operate in conjunction with the flash memory in a way that minimizes the amount of changes required to be made to the basic logic circuits of the flash memory. More specifically, the flash memory can be operated in a secure mode and in a non-secure mode wherein the security logic circuits are bypassed enabling the flash memory to operate as if such circuits had not been installed. The non-secure mode is normally entered when the contents of the flash memory's non-volatile lock memory are cleared. This is generally indicative of an unprogrammed or fully erased flash memory which naturally erases to a predetermined state (i.e. an all ONES state).

With the addition of a small amount of logic to the flash memory and an "Access Control Processor" (ACP), the contents of the flash memory is made secure without requiring data encryption. Therefore, the invention eliminates the overhead of encrypting and decrypting data which can be quite time-consuming for large blocks of data.

In operation, the ACP periodically prompts the user of the system for entry of some form of authentication. This may be a password, a PIN, a specific pen computer "gesture" performed at a specific point on the writing surface, a spoken command or a "voiceprint" of the user. The method varies with the system. The programmable ACP allows the user to alter the specific content of the authentication and the frequency of prompting. The code for authentication and the data required by the lock and access control memories are stored within the ACP's non-volatile memory which is on the same chip as the ACP and, hence, are protected.

As mentioned, a successful authentification causes the ACP to enable, or continue to enable, all or selected blocks of the flash memory for access. Failure causes access to the flash memory to be disabled. Thus, the operation is similar to a "dead man throttle" in that any failure to successfully complete authentication will cause the flash memory's data to be protected. In addition, a command initiated by the user can also cause access to be disabled. Further, upon first application of power from a powered off condition, access is blocked to protected memory contents until the first authentication is successfully performed.

Thus, if either the memory card or its host processor is lost, stolen, powered off or left unattended, the memory's data is protected from access, either immediately or as soon as the current periodic authentication expires. In the event of theft, the memory data is protected from access even if the memory card is opened and probed electronically or the memory chips are removed and placed in another device.

The above objects and advantages of the present invention will be better understood from the following description when taken in conjunction with the accompanying drawings.

DESCRIPTION OF THE PREFERRED EMBODIMENT

Figure 1:
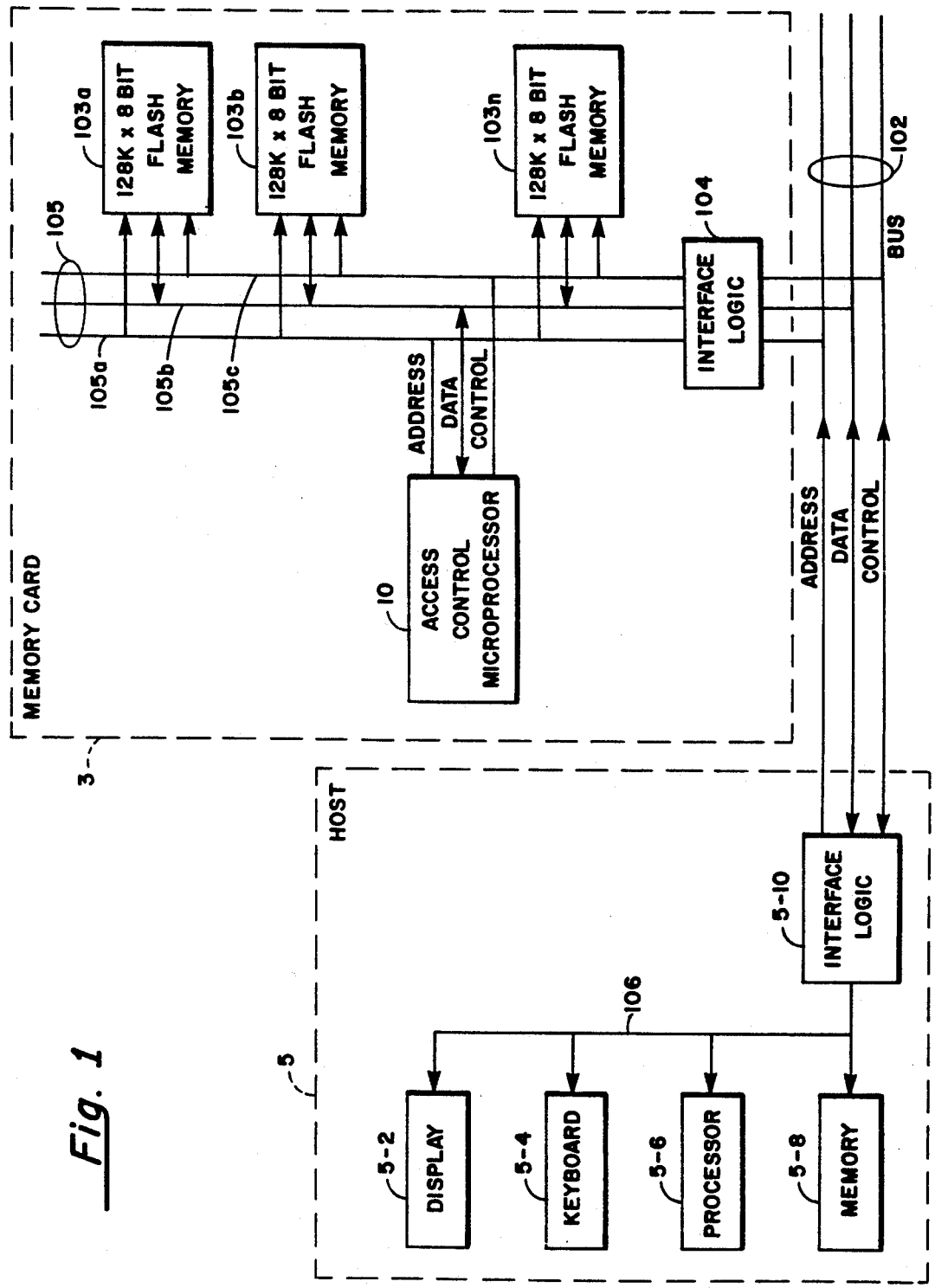
FIG. 1 shows an overall block diagram of a system which incorporates the memory card constructed according to the present invention.

FIG. 1 is a block diagram of a secure portable handheld computing system 1 usable as a personal computer or as a transaction processor. System 1 includes a memory card 3 constructed according to the present invention which connects to a host processor 5 by a bus 102. The host processor 5 may take the form of a palm top personal computer, such as the HP 95LX manufactured by Hewlett-Packard. The host processor 5 includes a liquid crystal display (LCD) 5-2, a keyboard 5-4, a microprocessor 5-6, a memory 5-8 and a serial interface 5-10 all coupled in common to a bus 106. The memory 5-8 includes a one megabyte read only memory (ROM) and a 512 Kbyte random access memory (RAM).

The connection between the memory card 3 and host processor 5 is established through a standard bus interface. In the preferred embodiment, the bus 102 conforms to the Personal Computer Memory Card International Association (PCMCIA) standard. The interface 102 provides a path for transferring address, control and data information between host processor 5 and the memory card system 3 via a standard interface chip 104 and a memory card bus 105. Each of the buses 102, 105 and 106 include a data bus, a control bus and an address bus and provide continuous signal paths through all like buses. For example, bus 105 includes address bus 105a, data bus 105b, and control bus 105c.

The PCMCIA bus standard has evolved from a standard which supports disk emulation on memory cards to a substantially different standard which allows random access to memory data. The memory card of the present invention provides a protection technique which supports this new standard by providing rapid access to random memory locations without resort to encryption techniques. By controlling the data paths which carry the data from the memory array to the host, the memory card of the present invention protects the data without imposing any time-consuming buffering, decryption or other serial processing in this path.

Typically, a user operates system 1 from the keyboard 5-4 to perform the typical operations such as spreadsheet and database functions which display information on display 5-2 and update information stored in files in memory card 3. The host processor 5 sends address information over bus 102 to retrieve information and if desired, updates the information and sends it, along with the necessary address and control information back to memory card 3.

As shown in FIG. 1, the memory card 3 of the present invention includes an access control processor (ACP) 10 coupled to bus 105 and a number (n) of CMOS flash memory chips 103a through 103n, each coupled to bus 105. ACP 10 is typically the same type of processing element as used in the "Smart Card". The CMOS flash memories 103a through 103n may take the form of flash memory chips manufactured by Intel Corporation. For example, they make take the form of the Intel flash memory chip designated as Intel 28F001BX 1M which includes eight 128 KBYTE×8 CMOS flash memories. Thus, a 4-MBYTE flash memory card could include 32 CMOS flash memories, that is 'n'=32.

ACCESS CONTROL PROCESSOR 10

Figure 2:
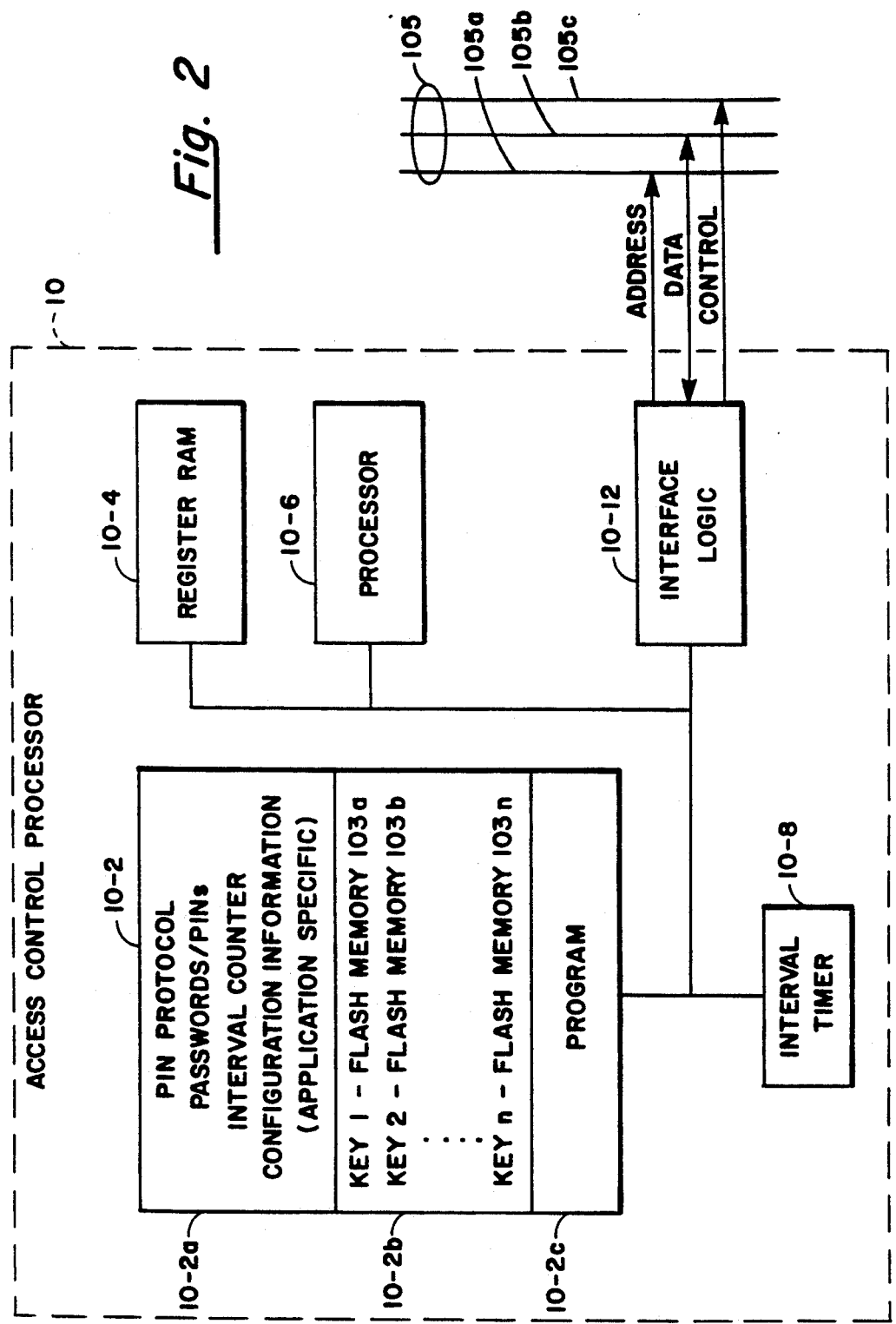
FIG. 2 shows in greater detail, the access control processor (ACP) of FIG. 1 including a layout of its non-volatile memory.

FIG. 2 shows in block diagram form, the access control processor (ACP) 10 of the preferred embodiment. As shown, ACP 10 includes a protected non-volatile memory 10-2, a random access memory (RAM) 10-4, a microprocessor 10-6, an interval counter 10-8 and an interface block 10-10 connected to bus 105. Non-volatile memory 10-2 dedicates a number of addressed locations in which to store authentication information and programs. More specifically, memory locations 10-2a store one or more personal identification numbers (PINs), protocol sequences or other identification information for verifying that the user has access to the system, and for identifying the blocks in flash memories 103a through 103n that the user may access in addition to a time interval value used for reauthentication.

Memory locations 10-2b store the key values used for protecting each of the flash memories 103a through 103n or the codes used to protect the individual blocks of each of the flash memories 103a through 103n.

Memory locations 10-2c store the program instruction sequences for performing the required authentication operations and for clearing the system if the preset conditions for failure are met. Certain program instructions enable the user to control the setting of the interval counter 10-8 which establishes when user re-authentication takes place. The reauthentication interval defines the time between interruptions and for sending an interrupt to the host processor 5 requiring verification of the user's identity by having the user reenter the PIN or other password. The interval counter 10-8 receives clock pulses from the host processor 5 over bus 102 and can be set by the user according to the work environment. For example, at home, the user may turn the timer off (i.e., set it to a maximum value), or set the time interval to one hour. On an airplane the user may set it for ten minutes for increased protection. As described herein, the user is prompted to re-examine the setting of this interval at every "power on" thereby forcing periodic re-authentications to enforce security.

FLASH MEMORIES 103a through 103n

Figure 3:
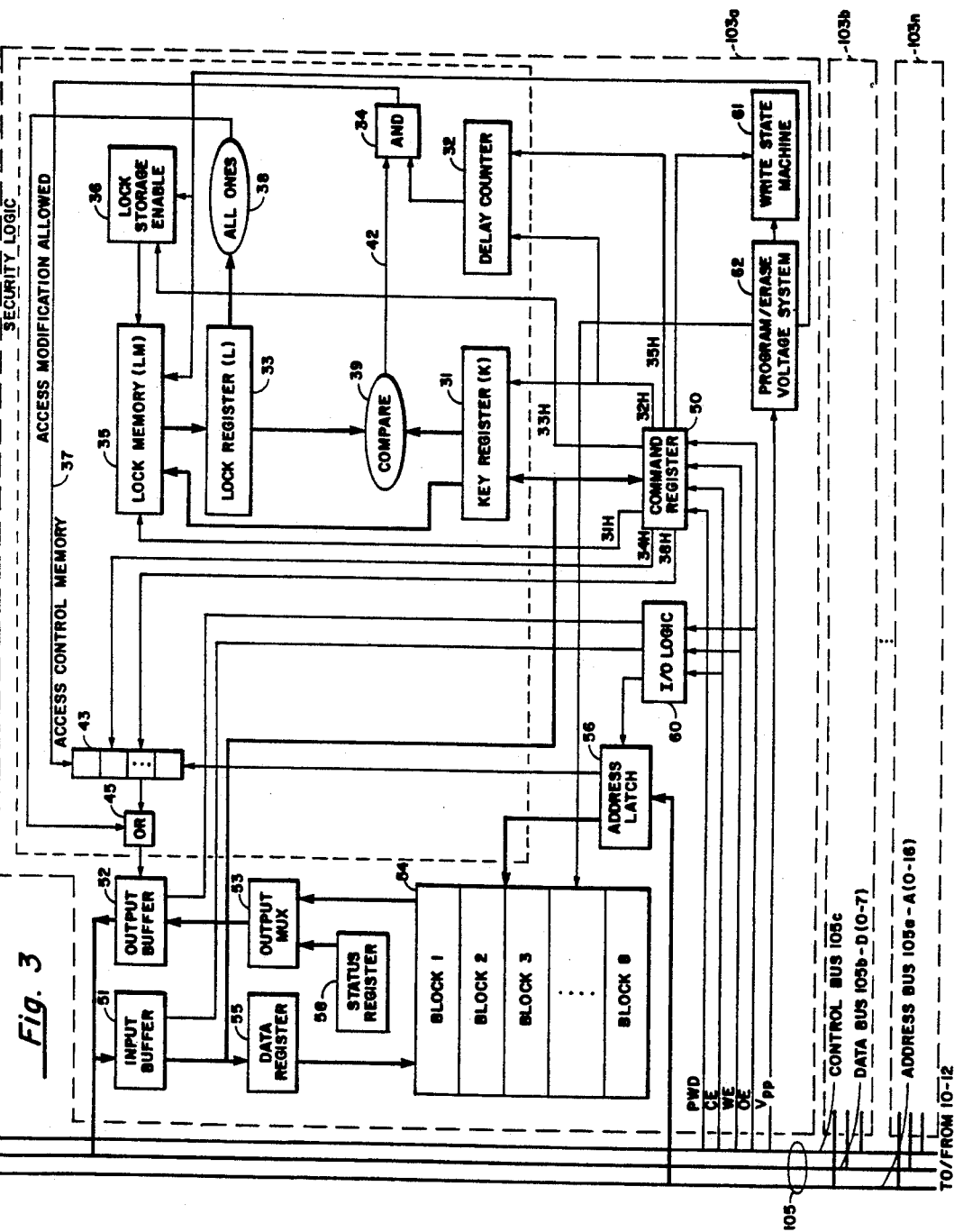
FIG. 3 shows a detailed block diagram of a standard flash memory of FIG. 1 modified according to the present invention.

FIG. 3 is a detailed block diagram of flash memories 103a through 103n. Only the detailed logic circuits of memory 103a are shown since memories 103b through 103n are constructed identically to memory 103a.

The flash memory 103a basically comprises two sections, a section containing the security access control circuits of the present invention and another section containing the basic or standard logic circuits of the flash memory.

Security Access Control Section

As seen from FIG. 3, the security control circuits of the present invention include a 32-bit key register, a 32-bit volatile lock register 33, a 12-bit delay counter 32, a comparator circuit 39, an all ONES detected signal circuit 38, a non-volatile lock memory 35, a one-bit non-volatile lock storage enable element 36, a volatile access control memory 43, an access modification allow AND gate 34 and an output OR gate 45 arranged as shown. It will be noted that this section receives command control signals designated by various hexadecimal values (e.g. 31H through 38H) from a command register 50 included in the basic logic section. These signals indicate the different data values of the set of commands received by the command register 50 from the ACP 10 via data bus 105b. These commands are an important extension to the sets of commands normally used by the flash memory. The standard flash memory commands take the form of the commands utilized by the 28F001BX flash memory. Those commands are described in the publication entitled, "Memory Products," published by Intel Corporation, referenced herein. The commands used by the present invention are described in Table 1.

Referring to Table 1, the first command shown is a load lock memory command which is used to initially load a random number generated lock value into non-volatile lock memory (LM) 35 in each memory 103a through 103n. Each memory 103a through 103n may have a different lock value or the same lock value depending on the security needs of the users. The lock value is loaded into LM 35 through key (K) register 31 under control of the one bit, non-volatile storage element 36. The reset lock storage enable command of Table 1 is used to reset storage element 36. This prevents the lock value stored in LM 35 from being changed since storage element 36 once reset by the reset lock storage enable command cannot be set. The non-volatile contents of LM 35 are transferred to the L register 33 on power-up. It will be noted that the location or site of lock memory 35 is design dependent. For example, memory 35 could be implemented as an extension to memory array 54.

The load key register command of Table 1 is used to load the key register 31 and set the delay counter 32. The decrement delay counter command is used by the ACP 10 to decrement by one, the contents of the delay counter 32. The read allow memory bank and read disable memory bank commands are used by the ACP 10 to enable or disable access to the different memory blocks of memory array 54 during loading of the access control memory 43.

TABLE 1

| Command | First Bus Cycle Operation | Address | Data | Second Bus Cycle Operation | Address | Data |
| --- | --- | --- | --- | --- | --- | --- |
| Load Lock Memory | Write | | 31H | Write | | N/A |
| Reset Lock Storage Enable | Write | | 33H | N/A | | N/A |
| Load Key Register | Write | | 32H | Write | | Key Data |
| Decrement Delay Counter | Write | | 35H | N/A | | N/A |
| Read-Allow Memory Bank | Write | MBA | 34H | Write | | MBA |
| Read-Disable Memory Bank | Write | MBA | 38H | Write | | MBA |

Load Lock Memory (31H)
This command copies the contents of the key register 31 into the non-volatile lock memory 35 if and only if the lock storage enable 36 output signal is TRUE.
Reset Lock Storage Enable (33H)
This command resets the lock storage enable logic element 36, thus inhibiting loading or changing the lock storage memory 35.
Load Key Register (32H)
This command shifts the prior contents of the key register 31, one byte (LSB toward MSB) and loads "Key Value" from ACP 10 into the key register LSB. Further, it sets the Delay Counter 32 to its maximum value, e.g., all ONES.
Decrement Delay Counter (35H)
This command decrements the delay counter 32 by ONE. The delay counter must equal ZERO to allow subsequent reading of the memory array 54.
Read-Allow Memory Bank (34H)
This command sets the bit corresponding to the memory bank address (MBA) in the access control memory 43 if and only if the access modification allowed signal 37 is TRUE. This allows read access to the selected bank.
Read-Disable Memory Bank (38H)
This command resets the bit corresponding to the memory bank address in the access control memory 43.

Considering Table 1 in greater detail, it is seen that Table 1 also shows the bus cycle operations for each of the added commands. For each command requiring two bus cycles, during each first bus cycle, the command register 50 receives an 8-bit command generated by ACP 10, sent via the data bus 105a of bus 105 and an input buffer 51. Command register 50 conditions the selected logic element to receive from data bus 105b, the information required to execute the command during a second bus cycle. As indicated, the second bus cycle is designated not applicable (N/A) since the reset lock storage enable and decrement delay counter commands need only one cycle for execution.

During normal operation, the K register 31 is loaded with the key value received from memory locations 10-2b by a load key register command and delay counter 32 is set to its maximum value. Delay counter 32 is decremented to all ZEROS in response to successive decrement delay counter commands received from the ACP 10 and generates a zero count output signal 41 which is applied as an input to AND 34.

Each delay counter 32 limits the number of tries or attempts which can be made to access the flash memories 103a through 103n in the case where a thief removes the chips and places them upon the "outlaw card" and programs a processor or equipment to repeatedly try to guess each memory chip's key. Stated differently, counter 32 ensures that a significant number of tries or attempts must be made in order to gain illegal access to the flash memories. The key and delay counter sizes are selected to require such testing to take an unreasonable amount of time.

More specifically, the Key Register 31 stores approximately 4 billion ($2^{32}$) different combinations. In the preferred embodiment, the delay counter 32 is a twelve-bit counter. Assuming the delay counter 32 is decremented once each microsecond, it will require $2^{12}$ or 4 milliseconds per attempt at guessing the key value. The ACP 10, knowing the correct key value, incurs only a four millisecond delay in the initial setup. Random attempts to guess the key value will require $2^{31}$ tries for a 50% chance of success. This would require $2^{31} \times 2^{12}$ microseconds or 102 days to guess the key value. This time is sufficient to deter most thieves. Of course, a longer or shorter time could be provided by modifying the sizes of the key and delay counter 32.

In the case where the memory card of the present invention is stolen and is put into an "outlaw host," the ACP 10 limits the number of tries by the thief to guess the PIN by known techniques. Such techniques may include locking access or destroying data if a threshold of incorrect guesses is exceeded.

During an initial authentication operation for flash memory 103a, a key value is loaded into the 32 bit K register 31 in response to four successive load key register commands (i.e., data bus 105b is a byte wide bus). Delay counter 32 is forced to its maximum count of (ALL ONE'S) and decremented by the ACP 10 sending decrement delay counter commands on successive first bus cycles. When the delay counter 32 is decremented to ZERO, it generates the zero count signal 41 which is applied to one input of AND gate 34.

If the key value stored in the K register 31 equals the lock value stored in the corresponding L register 33 indicating that the user provided the proper identification to the host processor 5, then compare logic 39 applies an equals compare signal 42 to another input of AND gate 34. This causes AND gate 34 to generate an access modification allowed signal 37 at its output, which enables -writing to access control memory 43, under the control of ACP 10. This, in turn, subsequently allows the reading of memory array 54.

The access control memory 43 contains volatile storage of one bit for each block/bank of the memory array 54. These bits are cleared to ZERO as part of the flash memory's power up sequence. In order for data to be read from the memory 103a, the bit corresponding to the addressed memory block must be at logical ONE. These bits are set by the ACP 10 issuing read-allow memory bank commands if and only if the access modification allowed signal 37 is TRUE.

As shown in Table 1, during the second bus cycle of the read-allow memory bank command, the three (3) high order address bits of the selected memory bank of memory array 54 are sent over address bus 105c as well as a repeat of the hexadecimal command identifier being sent over the data bus 105a to command register 50. This results in a ONE being written into the addressed bit location in access control memory 43. In the preferred embodiment, the read-allow memory bank command sequence is repeated eight times since the memory array 54 is organized into eight banks of 16K bytes each. The ACP 10 may restrict access to selected banks by issuing a sequence of read-disable memory bank commands in a similar manner.

The output of the access control memory 43 of the present invention is applied as an enabling input to output buffer 52 during each flash memory read cycle when the contents of a location of any bank of memory array 54 is being read out. That is, a read cycle may occur, however, the data read out is inhibited from passing through output buffer 52 in the absence of the appropriate bank's access control memory gating signal. More specifically, in the case of the preferred embodiment, access control memory 43 includes eight individually addressable bit storage elements, an input address 3 to 8-bit decoder connected to the input of each storage element and a 1 to 8 output multiplexer circuit connected to the output of each storage element. The three high order address bits of each address are decoded and used to select the storage element for the block whose contents are to be changed. Similarly, the same three bits are used to select the output of the storage element for the block containing the flash memory location being read.

If the lock memory 35 is fully erased, i.e., at ALL ONES as indicated by the contents of the L register 33 being at all ONES, then the output buffer 52 is always enabled. That is, when lock register 33 contains "ALL ONES," this generates a signal from ALL ONES detector element 38 to the OR gate 45 to enable the output buffer 52. This effectively places flash memory 103a in non-secure mode. This allows all of the security logic circuits of the present invention to be bypassed. Hence, the same flash memory chip can be used for both secure and non-secure applications, thus resulting in production economies.

Flash Memory Basic Logic Circuits

As shown in FIG. 3, such circuits include a memory array 54, a command register 50, input/output logic circuits 60, an address latch 56, a write state machine 61, erase voltage system 62, an output multiplexer 53, a data register 55, input buffer 51, output buffer 52 and a status register 58, as shown. The basic logic circuits of flash memory 103a as discussed above, takes the form of the type of circuits included in the flash memory designated as 28F001BX manufactured by Intel Corporation. Since such circuits are conventional, they will only be described to the extent necessary. For further information regarding such circuits, reference may be made to pages 3-109 through 3-134 of the publication entitled, "Memory Products," order Number 210830, published by Intel Corporation, dated 1992. As shown in FIG. 3, the flash memory basic circuits receive a number of input signals (A0-A16), address, data signals (D00-D07) and control signals (CE, WE, OE, PWD and VPP). These signals are described below in Table 2.

TABLE 2

| Symbol | Signal Descriptions Name and Function |
|---|---|
| A0-A16 | ADDRESS INPUTS for memory addresses. Addresses are internally latched during a write cycle. |
| D00-D07 | DATA INPUTS/OUTPUTS: Inputs data and commands during memory write cycles; outputs data during memory and status read cycles. The data pins are active high and float to tri-state off when the chip is deselected or the outputs are disabled. Data is internally latched during a write cycle. |
| CE | CHIP ENABLE: Activates the device's control logic, input buffers, decoders and sense amplifiers. CE is active low, CE high deselects the memory device and reduces power consumption to standby levels. |
| PWD | POWERDOWN: Puts the device in deep powerdown mode. PWD s active low; PWD high gates normal operation. PWD=VHH allows programming of the memory blocks. PWD also locks out erase or write operations when active low, providing data protection during power transitions. |
| OE | OUTPUT ENABLE: Gates the device's outputs through the data buffers during a read cycle. OE is active low. |
| WE | WRITE ENABLE. Controls writes to the command register and array blocks. WE is active low. Addresses and data are latched on the rising edge of the WE pulse. |
| Vpp | ERASE/PROGRAM POWER SUPPLY for erasing blocks of the array or programming bytes of each block. Note: With Vpp < Vpp1 Max, memory contents cannot be altered. |

As shown in Table 2, the Chip Enable (CE), Write Enable processor (WE) and Output Enable (OE)) signals are applied to command register 50 and I/O logic 60 from host processor 5, via bus 102 and control bus 105b and are dispersed to control specified logic blocks. A powerdown (PWD) signal is also applied to command register 50 for enabling the flash memory to perform the operations specified in Table 2. This signal can be used to clear the volatile storage elements of the flash memory's security control section as desired thereby enforcing user reauthentication when normal operation is again resumed.

Generally, the basic logic elements of the flash memory operate in the following manner. Information is stored in memory array 54 via data bus 105a, input buffer 51 and data register 55 at an addressed location of one of the memory blocks specified by the address received by an address logic 56 from address bus 105c. Information is read from a specified address location of a bank of memory array 54 and is sent to host processor 5 via an output multiplexer 53, output buffer 52, data bus 105a and bus 102. Status register 58 is used for storing the status of the write state machine, the error suspend status, the erase status, the program status and the Vpp status.

The write state machine 61 controls the block erase and controls program algorithms. The program/erase voltage system 62 is used for erasing blocks of the memory array 54 or the programming bytes of each block as a function of the level of Vpp (i.e., when Vpp is at a high level programming can take place; if Vpp is at a low level, memory array 54 functions as a read only memory).

DESCRIPTION OF OPERATION

The operation of the secure memory card of the present invention will now be described with particular reference to the flow diagram of FIGS. 4 and 5. Before describing such operations in detail, the steps involved in the fabrication, customization and operation of the memory card will first be described.

As a first step, at card fabrication, the ACP 10 sets the lock value for each of the memory chips on the memory card. It does this by loading the key value into the lock memory of FIG. 3. These values are stored in the ACP's protected non-volatile memory 10-2 (i.e., keys 1-n in FIG. 2). The lock storage enable elements 36 are then set to ZEROs to inhibit further changing or reading of lock memory contents. As these elements are nonvolatile, they cannot be changed unless the entire flash memory chip is cleared.

As a second step, at application customization, since writing is not affected by the protection functionality, the memory card can then be loaded with its data or software application. The ACP 10 is then loaded with information pertaining to the memory's bank structure and the degrees of protection which are to be applied to each memory bank.

As a third step, at user customization, the user establishes parameters for the frequency and mode of authentication and specific data required (e.g., personal identification numbers (PINs)). This information is stored in the ACP'S memory.

As a fourth step, at power on, the "key register", "access modification allowed" signal and "access control memory" are initialized so as to inhibit access to data or writing to access control memory 43. The first authentication dialog is initiated.

At first authentication dialog, the ACP 10, using the services of its host processor 5, prompts the user and receives authentication information. If authentication is unsuccessful, no operation is performed; if successful, the key register of each memory chip is loaded with the value stored in the ACP'S memory. During this operation, the delay counter 32 is used to inhibit chip operation for a period of time following loading to make random tries an unproductive process. Loading of the key registers causes the "access modification allowed" signal to be true in each chip. The ACP 10 then establishes access by loading the access control memories according to the stored information configuration.

As a sixth step, at subsequent authentication dialog, periodically, according to the user's configuration, the ACP 10 prompts an additional user authentication (reauthentication). In the event of failure, the ACP 10 forces all memory chips to their power on states, thus inhibiting any access to the memories' data by clearing the access control memory 43 and clearing the contents of the key register 31. Now, the operation of the system of FIG. 1 will be described with reference to FIGS. 4 and 5.

First Operations of the Day

Figure 4:
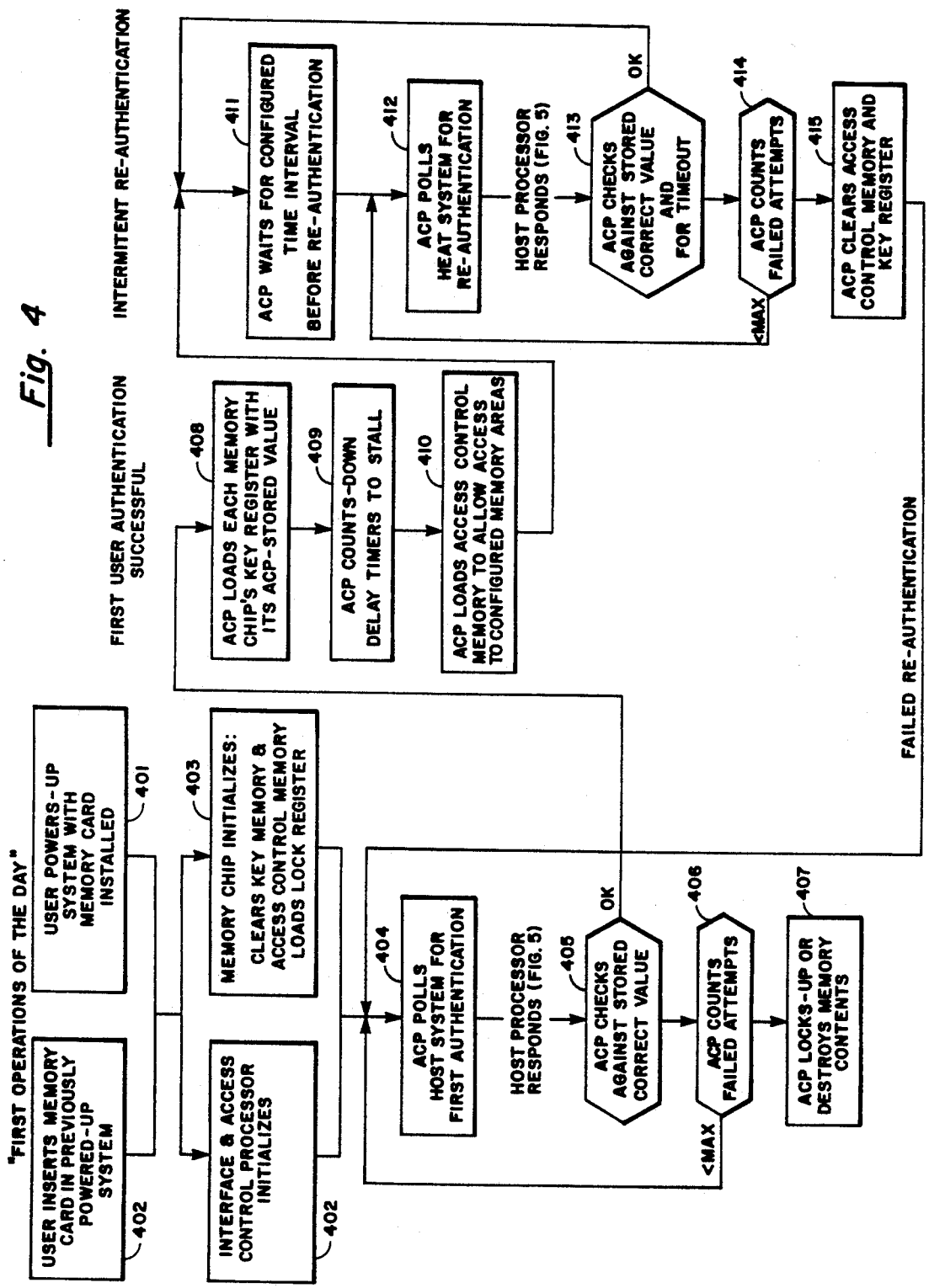
FIGS. 4 and 5 are flow charts used to explain the operation of the memory card of the present invention in carrying out various authentication procedures.

FIG. 4 shows in block diagram form, the various modes of operation. Blocks 402 and 401 show the two startup conditions. In block 402, the user inserts the memory card 3 in the previously powered-up host processor 5. In block 401, the user powers up host processor 5 with memory card 3 already installed.

In either of the above startup operations, during block 402, the ACP 10 and its interfaces are initialized in a conventional manner, and block 403 clears all of the 'n' K registers 31 and the 'n' access control memories 43 as part of the flash memories 103a through 103n internal initialization sequence. This prevents any data from being read out of memories 103a through 103n since output buffer 52, in each memory, is disabled. The lock value is loaded into the 'n' L registers 33 from the respective LMs 35 as a result of power on.

Now in block 404, ACP 10 sends an interrupt signal to host processor 5 which responds by requesting the PIN or other identifying information from the user. In block 405, ACP 10, by means of the program stored in memory locations 10-2a, checks that the PIN or other identifying information matches the information stored in memory locations 10-2a. If no match, then decision block 406 counts an error and ACP 10 branches to block 404 to repeat the test. If the test fails a preset number of times, then decision block 406 branches to block 407 to cause ACP 10 to either lock up or destroy the contents of the memories 103a through 103n.

First User Authentication Successful

If in decision block 406 there is a match indicating a successful authentication then in block 408, the ACP 10 via a load key register command loads each K register 31 from memory locations 10-2b with the appropriate key value. Also block 409 repeatedly decrements the contents of delay counter 32 issuing successive the decrement delay counter commands toward a binary zero count which causes the generation of the zero count signal 41 in FIG. 3.

In block 410, each access control memory 43 location is loaded with information by means of the read-allow memory bank command to allow access to the selected banks of the corresponding flash memory 103a through 103n.

Intermittent Re-authentication

In block 411, the ACP 10 awaits the end of the preset time interval established by information stored in memory locations 10-2a signalled by interval counter 10-8 before requesting user re-authentication. Then, in block 412, the ACP 10 interrupts the host processor 5 to request the user to re-enter the PIN or other required identification.

Decision block 413 checks the PIN or other information received from the host processor 5 against the information stored in memory locations 10-2a and the interval timer 10-8 output is recorded. The user has a preset time interval of typically 30 seconds in which to enter the authentication information into host processor 5. While the clock is running, if the decision block 413 test fails, then block 414 records the test as an error. At that time, it checks if a maximum number of errors was received and branches to repeat blocks 412 and 413. If the number of errors equals the maximum number, then in block 415, APC 10 clears the flash memory K register 31 by means of successive load key register commands, and clears the access control memories 43 with successive read-disable memory commands. Block 415 then branches to block 404 to allow a new "First Authentication" operation to take place.

If the test in decision block 413 is successful, the K register 31 remains unchanged (i.e., contains the key value previously loaded by the ACP) enabling the user to continue to operate the system 1. In the event that the 30 seconds elapsed without decision block 413 receiving the PIN or other information, the ACP 10 clears the K register 31 and the access control memory 43 as before.

Figure 5:
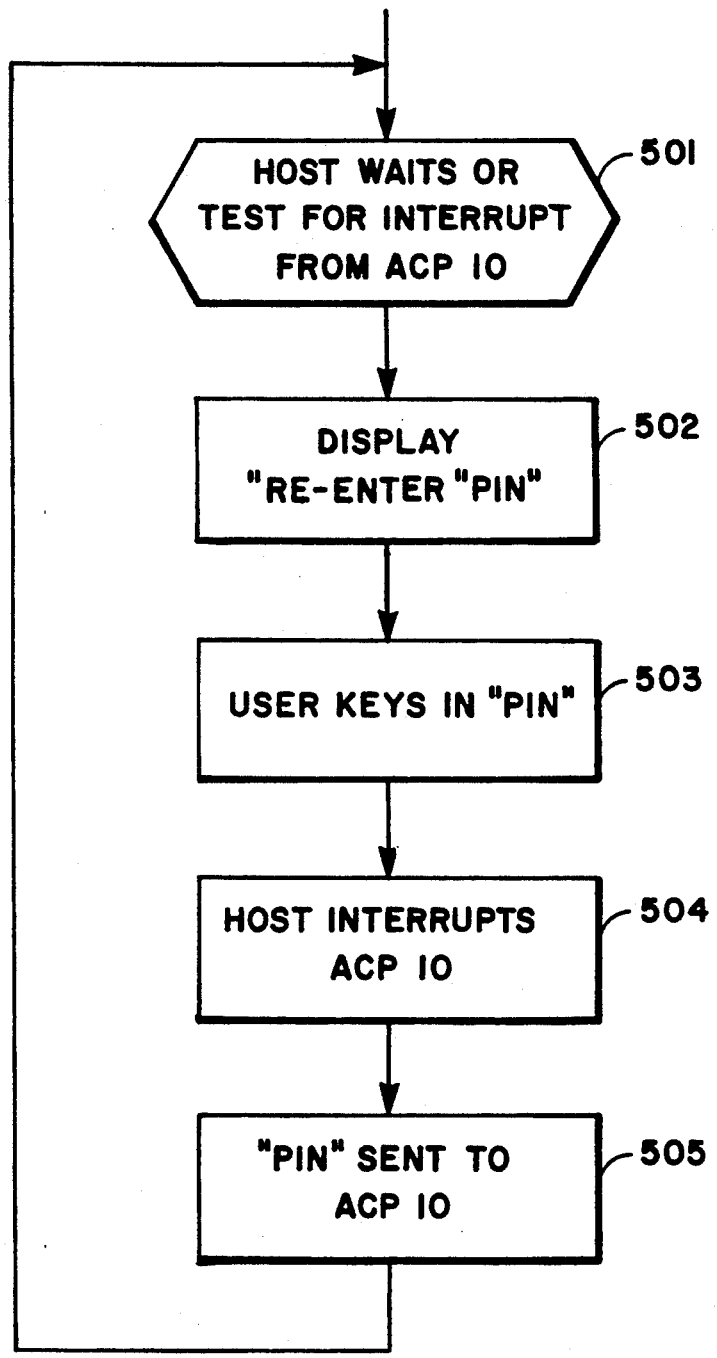

FIG. 5 is a flow diagram which illustrates how host processor 5 responds to an interrupt request from APC 10 for authentication in response to blocks 404 and 412 of FIG. 4. As shown, decision block 501 is waiting for an interrupt from the ACP 10 requesting that the user re-enter the PIN or other information. Decision block 501 branches to block 502 when it receives the interrupt from blocks 404 or 412. Block 502 displays the request for the PIN or other information on host display 5-2. Block 503 accepts the information from the keyboard and block 504 interrupts ACP 10. Block 5 sends the PIN to ACP 10.

It will be appreciated by those skilled in the art that many changes may be made to the preferred embodiment of the present invention without departing from its teachings. For example, the invention may be used with different types of non-volatile memories and different interfaces, etc.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A secure memory card for use with a host portable computer, said memory card comprising:
    a microprocessor connected for transmitting and receiving address, data and control information to and from said host computer and said microprocessor including:
    an addressable non-volatile memory for storing information including a number of key values and configuration information;
    an internal bus connected to said microprocessor for transmitting address, data and control information defining memory operations to be performed by said card; and,
    at least one non-volatile addressable memory being connected to said internal bus in common with said microprocessor for receiving said address, data and control information, said memory including a non-volatile memory section and a security control section, said memory section containing a memory array organized into a number of blocks, each block having a plurality of addressable locations and control logic means for performing said memory operations and said security control section being connected to said internal bus, to said control logic means and to said memory array, said security control section including:
    a number of non-volatile and volatile storage devices for storing at least one of said key values and configuration information associated with said blocks; and,
    access control logic means connected to said control logic means and to said storage devices, said access control logic means enabling reading of information stored in addressed ones of said blocks of said memory array as specified by said configuration information only after said microprocessor has determined that a predetermined authentication procedure has been performed with said host computer and has enabled said access control logic means for allowing reading of said information from said memory array according to said configuration information.

2. The memory card of claim 1 wherein said microprocessor and said non-volatile memory are included on separate semiconductor chips.

3. The memory card of claim 1 wherein said card further includes interface circuit means coupling said card to said host computer and wherein said interface circuit means and said microprocessor are included on the same semiconductor chip.

4. The memory card of claim 1 wherein said non-volatile memory and said non-volatile storage devices are flash memories.

5. The memory card of claim 1 wherein one of said non-volatile storage devices is a lock memory for storing a lock value corresponding to said one key values and a second one of said non-volatile devices is a lock storage enable element which connects to said lock memory, said lock memory being initially loaded with said lock value and said lock storage enable element being switched to a state which inhibits modification of said lock value under control of said microprocessor.

6. The memory card of claim 2 wherein storage of said lock value and switching of said lock storage enable element takes place during initial fabrication of said memory card.

7. The memory card of claim 5 wherein one of said volatile storage devices is an addressable access control memory having a plurality of locations corresponding in number to said number of blocks of said memory array for storing said configuration information, said access control memory being connected to said internal bus and to said access control logic means, said access control memory being loaded under control of said microprocessor only after said microprocessor has determined that said predetermined authentication procedure initially has been successfully performed with said host computer causing enabling of said access control memory by said access control logic means.

8. The memory card of claim 7 wherein said lock value loaded into said lock memory is all ONES and wherein said security control section further includes an all ONES detector circuit connected to said lock memory, said detector circuit in response to said lock value of all ONES generating a signal which effectively bypasses said security control section enabling said nonvolatile memory to operate as if said security control section had not been included.

9. The memory card of claim 7 wherein performance of said predetermined authentication procedure initially takes place when said memory card is first connected to communicate with said host computer.

10. The memory card of claim 9 wherein said access control means includes a lock register connected to receive said lock value from said lock memory, a comparator circuit, a key register for storing a key value transferred to said key register by said microprocessor, a delay counter for storing a count defining a predetermined time interval and gating means connected to said access control memory, to said comparator and to said delay counter, said comparator circuit being connected to said lock and key registers and to said gating means and said gating means being connected to said delay counter for generating an access modification allowed signal in response to said comparator circuit signalling an identical comparison between said lock code value loaded into said lock register when said delay counter has signalled an end of said predetermined time interval, said access modification allow signal conditioning said access control memory for loading said configuration information.

11. The memory card of claim 10 wherein said control logic means includes circuits for generating command signals in response to a predetermined set of commands used by said microprocessor in controlling the operation of said security control section of each memory chip.

12. The memory card of claim 11 wherein said control logic means in response to a first one of said predetermined set of commands generated by said microprocessor, generates a first signal for loading said lock code value into said lock memory, said first one of said predetermined commands being generated during initial fabrication of said card.

13. The memory card of claim 12 wherein said control logic means in response to a second one of said predetermined set of commands generated by said microprocessor generates a second signal for switching said lock storage enable element to a predetermined state which inhibits said reading or said modification to said lock value stored in said lock memory.

14. The memory card of claim 12 wherein said control logic means in response to a third one of said predetermined set of commands generated by said microprocessor, generates a third signal for loading said key register with a predetermined one of said key values, said third one of said predetermined set of commands being generated by said microprocessor only after said microprocessor has determined that said predetermined authentication procedure has been successfully performed.

15. The memory card of claim 14 wherein said third signal generated by said control logic means simultaneously forces said delay counter to a predetermined count for establishing a start of said predetermined time interval and wherein said control logic means in response to each fourth one of said predetermined set of commands generated by said microprocessor decrements by one, said predetermined count, said delay counter signalling said end of said time interval following execution of a predetermined number of said fourth ones of said set of predetermined commands.

16. The memory card of claim 11 wherein said control logic means in response to a number of fifth and sixth ones of said predetermined set of commands by said microprocessor, generates fifth and sixth signals for setting and resetting locations in said access control memory according to said configuration information for defining which ones of said blocks from which information is allowed to be read out.

17. A secure memory card installable in a host portable computer for establishing communication with said host computer, said memory card comprising:
a microprocessor contained on a single semiconductor chip, said microprocessor being connected for transmitting and receiving address, data and control information to and from said host computer and said microprocessor including:
an addressable non-volatile memory for storing information including a number of key values defining user accessibility to memory areas, and memory configuration information defining memory read out accessibility to said memory areas;
an internal bus for transmitting address, data and control information defining memory operations to be performed by said card; and,
at least one non-volatile addressable memory chip being connected to said internal bus in common with said microprocessor for receiving said address, data and control information, said memory chip including a memory section and a security section, said memory section containing a non-volatile memory array having a data output and being organized into a number of blocks, each having a plurality of addressable locations and control logic means for performing said memory operations, said security section being connected to said internal bus, to said control logic means and to said data output and said security section including:
a non-volatile lock memory coupled to said internal bus for initially receiving and permanently storing a predetermined lock value which matches one of said number of key values;
access control logic means connected to said control logic means and to said lock memory for generating an enabling signal upon detecting when said predetermined lock code value identically matches a selected one of said key values applied by said microprocessor to said internal bus; and,
an addressable volatile access control memory having a plurality of locations corresponding in number to said number of blocks of said memory array for storing said memory configuration information defining said read out accessibility, said access control memory being connected to said control logic means, to said memory array data output, to said internal bus, and to said access control logic means, said access control logic means enabling reading of information stored in addressed ones of said blocks of said memory array as specified by said memory configuration information only after said microprocessor has determined that a predetermined authentication procedure has been successfully performed with said host computer and has transferred said predetermined one of said memory key codes causing said access control logic means to generate said enabling signal for application to said data output for enabling reading out said information to said data output as specified by said access control memory configuration information.

18. A secure memory card including a number of non-volatile memory chips, each memory chip including a memory array organized into blocks of addressable locations, having a capability of operating in a number of modes, said card comprising:

a lock memory for storing a lock value;

control means for generating first and second commands and a predetermined key value;

a key register coupled to said control means and responsive to said first command for storing said predetermined key value;

a comparator coupled to said lock memory and to said key register, said comparator generating a compare signal whenever said lock value and said predetermined key value are equal;

a delay counter coupled to said generating means and responsive to said first command for setting said counter to a maximum count value, and responsive to a sequence of successive second commands for generating a zero count signal when said delay counter has been decremented to zero;

logic circuit means coupled to said comparator and to said delay counter, said logic circuit means responsive to said compare signal and said zero count signal for generating an access modification allowed signal;

said control means for generating a third command, and first address signals and subsequent address signals identifying a first of said blocks and subsequent blocks respectively; and, access control memory means being coupled to said logic means and to said control means, said access control memory responsive to said access memory enable signal, said address signals and said third command for storing indications signifying when said one of said blocks and said subsequent blocks are enabled for reading.

19. The system of claim 18 wherein said predetermined value and maximum values are selected to be sufficiently large so as to prevent ease of access to said information stored in said non-volatile memory when said memory card is placed in an unauthorized host computer.

20. The card of claim 18 wherein said control means includes a microprocessor which couples to said memory which, upon successfully performing a first user authentication operation, generates said first, second and third commands.

21. The card of claim 20 wherein said first command is a load key command, said second command is a decrementing command and said third command is a read allow block command.

22. The card of claim 18 wherein said memory further includes command control means for decoding a predetermined set of commands for conditioning said card to perform normal memory operations, and said command control means including means for decoding an additional set of commands including said first, second and third commands for providing security for information stored in said memory.

23. A method of organizing for operation, a secure memory card installable in a host computer which includes a number of non-volatile memory chips, each memory chip including a memory array organized into blocks of addressable locations and control logic circuits for generating command signals for performing memory operations, said method comprising the steps of:

(a) incorporating a microprocessor into said card which is connected to communicate with said host computer when installed therein, said microprocessor including an addressable non-volatile memory for storing information including a number of key values defining user accessibility to memory areas and memory configuration information defining accessibility to said memory areas;

(b) incorporating security logic circuits into each non-volatile memory chip, said security logic circuits including a non-volatile lock memory for storing a predetermined lock value, access control logic means connected to said lock memory and an addressable volatile access control memory having a plurality of locations corresponding in number to said number of blocks for storing accessibility bit information according to said configuration information;

(c) interconnecting said microprocessor to each memory chip for transferring address, data and control information to said each memory chip;

(d) modifying said control logic circuits to be responsive to a plurality of commands for operating said security logic circuits;

(e) connecting said microprocessor for performing an initial preestablished user authentication operation with said host computer; and, (f) connecting said security logic circuits to be enabled by said microprocessor transferring specific ones of said plurality of commands to said each chip only when said authentication operation in step (e) has been successfully performed for allowing said information stored in different ones of said blocks to be read out according to said accessibility bit information stored in said access control memory.

24. The method of claim 23 wherein said microprocessor non-volatile memory has a number of sections and wherein said key values are provided by generating random values for said key values which are to be loaded into a first one of said number of sections.

25. The method of claim 23 wherein said method further includes the steps of: (g) including an interval counter in said microprocessor; (h) connecting said interval counter to said microprocessor non-volatile memory and said interval counter being loaded with a value corresponding to a user selected time interval;

(i) connecting said microprocessor for periodically initiating said user authentication operation of step (e) at said user selected time interval; and, (j) connecting said security logic circuits to be enabled for continuing to allow said information stored in said blocks to be read out according to said accessibility bit information as long as said authentication operation of step (e) is successfully performed.

26. A method of constructing a secure memory card which includes a number of non-volatile memory chips for storing large quantities of information, each memory chip including a memory array organized into blocks of addressable locations and control logic circuits for generating command signals for performing memory operations, said method comprising the steps of:

(a) incorporating a microprocessor into said card, said microprocessor including an addressable non-volatile memory for storing information including a number of key values defining user accessibility to memory areas and memory configuration information defining accessibility to said memory areas;

(b) incorporating security logic circuits into each non-volatile memory chip, said security logic circuits including a non-volatile lock memory for storing a predetermined lock value, access control logic means connected to said lock memory and an addressable volatile access control memory having a plurality of locations corresponding in number to said number of blocks for storing user accessibility bit information in accordance with said configuration information;

(c) interconnecting said microprocessor to each memory chip for transferring address, data and control information to said each memory chip; and, (d) modifying said control logic circuits to incorporate a plurality of commands for operating said security logic circuits as an extension to a set of commands normally provided by said control logic circuits whereby said security logic circuits protect said information contained in said number of chips from being read out in an unauthorized manner even when said chips are removed from said memory card.

* * * * *